United States Patent
Kronenberg et al.

(10) Patent No.: US 6,346,709 B1
(45) Date of Patent: Feb. 12, 2002

(54) ALPHA, BETA, AND GAMMA MONITOR FOR MEASURING CONCENTRATIONS OF IONIZING RADIATION EMITTERS IN AMBIENT AIR OR OTHER MEDIA

(75) Inventors: Stanley Kronenberg, Skillman; George J. Brucker, West Long Branch; Steven A. Horne, Manasquan, all of NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/516,083

(22) Filed: Mar. 1, 2000

(51) Int. Cl.[7] ............................................... H01J 47/08
(52) U.S. Cl. ...................................... 250/376; 250/375
(58) Field of Search ................................ 250/376, 375, 250/374

(56) References Cited

U.S. PATENT DOCUMENTS

| | | | |
|---|---|---|---|
| 4,488,046 A | * 12/1984 | Bernstein | 250/474.1 |
| 4,644,167 A | * 2/1987 | Sorber | 250/374 |
| 4,931,653 A | * 6/1990 | Hamm et al. | 250/385.1 |
| 5,059,803 A | * 10/1991 | Kronenberg | 250/374 |
| 5,426,305 A | * 6/1995 | Siebentritt | 250/374 |

FOREIGN PATENT DOCUMENTS

CA 2116252 * 8/1995

OTHER PUBLICATIONS

J.N. Standard Radioactivity and Health, edited by R.W. Baalman, Jr., published by the office of Scientific and technical information, Springfield, Virginia, Oct. 1988.

* cited by examiner

Primary Examiner—Scott J. Sugarman
Assistant Examiner—Mohammed Hasan
(74) Attorney, Agent, or Firm—Michael Zelenka; George B. Tereschuk

(57) ABSTRACT

A low cost and simple technique for measurement of radioactive contaminants in the air, soil, or in buildings is provided. The alpha, beta gamma radiation monitor comprises a thin window and two more removable radiation windows on top of a pancake-shaped conductive plastic chamber, with a microscope and a carbon fiber electrometer within the chamber protruding through the chamber's side wall, and the microscope and electrometer opposing each other. Within the chamber the microscope is optically focused on the electrometer fiber. Three radiation windows are provided: one admits alpha particles, beta particles and gamma radiation to the chamber, another admits beta particles and gamma radiation, and a third one admits only gamma radiation. Thus one can measure or observe alpha, beta, and gamma radiation, beta and gamma radiation, or only gamma radiation. The present invention's configuration allows the concentration of each type of radiation to be independently determined. The radiation that penetrates one of the radiation windows generates an ionization charge within the chamber that causes a carbon fiber image to move along a scale within the microscope as a function of time to produce the desired reading. In the case of airborne alpha emitting contaminants either the concentration of alpha particles or the total alpha energy of the emission can be measured.

30 Claims, 5 Drawing Sheets

ALPHA, BETA, AND GAMMA MONITOR FOR MEASURING CONCENTRATIONS OF IONIZING RADIATION EMITTERS IN AMBIENT AIR OR OTHER MEDIA

GOVERNMENT INTEREST

The invention described herein may be manufactured, used, sold, imported, and/or licensed by or for the Government of the United States of America without the payment to us of any royalties thereon.

FIELD OF INTEREST

The invention relates to radiation sensors and, more particularly, to the measurement of radioactive contaminants in ambient air, soil or other types of media.

BACKGROUND OF THE INVENTION

It would often be desirable to quickly, accurately and inexpensively monitor the concentration of radionuclides found in the atmosphere, soil, or other places. Usually such contaminants consist of naturally occurring radionuclides in the atmosphere, namely, progenies of Radon-222 and Radon-220 (Thoron). In places where radioactive materials are stored, processed, or used, other radioactive contaminants may be present. The need for quick, accurate and inexpensive monitors for measuring radionuclides found in the air, soil, or attached to structures is important for such locations. In addition, homeowners and real estate purchasers are concerned about radon concentrations in the home. The National Research Council recently identified Radon in the home as an important public health problem, causing as many as 21,800 deaths annually (New York Times Feb. 20, 1998, page A 13).

The current commercial Radon measurement technique is to collect Radon in a charcoal filter that is sent to a laboratory where the gamma ray emission is counted and correlated with the equivalent number of picoCuries per liter (pCi $l^{-1}$) of alpha particles in ambient air. Such commercial procedures require placing a charcoal canister within a home or commercial building for a week, then sending the sample to a laboratory for testing and waiting for the test results. One significant disadvantage with this approach is that such measurements are not made in real time. There is a critical and long-felt need for an improved Radon progenies measurement technique.

However, Radon and Thoron cannot be directly correlated with potential damage to lung tissue. Radon itself, a noble gas, is in a neutral electronic state, not attached to aerosols, and therefore, being chemically inert it is inhaled and exhaled without consequence to the lungs. The progeny $^{214}$Po is also excluded because of its very short half-life of $10^{-6}$ min.

EPA regulations are based on radon concentrations. Radon concentrations are used this way because this is a quantity that can be readily measured. However, radon concentration is proportional to potentially harmful alpha emitters only in cases where secular equilibrium of radon with its daughter products exists, or is at least a fixed fraction. In practice, this is never the case, because this equilibrium varies between 10% and 90% depending on location and time.

The total energy of alpha particles emitted by inhaled air is the quantity, which is most strongly connected to the potential health hazard to lung tissue. Currently, the two most frequently used measurement units for radon inhalation standards are the Working Level (WL) and the pCi$^{-1}$ of radon. One WL represents the total energy emitted by alpha particles from radon daughters ($^{218}$Po, $^{214}$Pb and $^{214}$Bi), and presumably absorbed by lung tissue as a consequence of one person breathing ambient air containing 100 pCi $l^{-1}$ of radon. Under these conditions, the total energy, including all the energy emitted by alpha particles trapped in the lungs after enough half-lives have passed to bring their activity to virtually zero, was calculated as $1.275 \times 10^5$ Mev per liter of air. See J.N. Standard Radioactivity and Health, edited by R. W. Baalman, Jr., published by the Office of Scientific and technical Information, Springfield, Va., October 1988. This definition of WL does not include Radon-222 and Po-214.

The present invention can measure either the concentration of harmful alpha emitters or the total energy delivered by them. This last parameter can be measured by making the height of the chamber depicted in FIG. 2 equal to the range in air of the biggest alpha energy in question, which is 5.5 mm, rather than 27.7 mm.

SUMMARY OF THE INVENTION

The present inventors have answered the long-felt need for an improved low cost and simple measurement technique of radioactive contaminants in the air, soil, or in buildings without suffering from the disadvantages and limitations of current commercial practices and instrumentation. The radiation monitor of the present invention comprises a series of three radiation windows on top of a pancake-shaped conductive plastic chamber, with two of the windows being removable, and a microscope and a carbon fiber electrometer protruding through the chamber's side wall, as depicted in FIGS 1 and 2. The radiation windows further comprise a thin aluminized polyester electrically conductive polyethylene terephthalate film (mylar) window to admit alpha particles, which can be combined with a second thicker mylar window to eliminate alpha particles, as well as a thicker plastic window which eliminates alpha and beta particles but admits gamma rays, as depicted in FIGS 3–5. These three windows, or means for covering, can be advantageously combined or used alone for measuring the different forms of contamination. Thus one can observe preferentially the contributions to the measurement of alpha, beta, and gamma radiation, beta and gamma radiation, or only gamma radiation. The present invention's configuration allows the concentration of each type of radiation to be independently determined. The covering means could also include other windows for admitting or eliminating different forms of radioactive contamination.

Using an adequate air filter paper and an air sampler, one can collect air borne contaminants and provide a sample for the measurement. All (100%) radioactive aerosol particles and positively charged radioactive ions become absorbed in the filter paper. This filter paper is then placed on top of the window of the pancake-shaped monitor, which has been charged to read zero, and the discharge time, expressed in scale units per minute of discharge time, is then observed. This discharge time is inversely proportional to the amount of radioactive material captured on the filter. In our measurements, filter paper in the shape of a disk with a diameter of 4.7 cm was used. The chamber walls of the initial prototype monitor were constructed with Vectra™, which is a tissue equivalent plastic. The filter paper used was Millipore pore size 0.8 μm, which is available in their catalog.

To better understand and appreciate the operation of the present invention, some details of the physics involved in measuring the alpha emissions from progeny of Radon-222 are described. The source of the Radon is Uranium, naturally occurring in the earth's crust. The decay portion of the Uranium-Radium series, comprising Radon-222 and leading to Lead-210 is as follows:

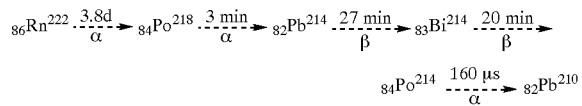

An analogous decay series describes the decay of Radon-220 (Thoron) into its progeny.

The decay process creates positive ions that attach to aerosol particles and these particles can be collected on filter paper by passing air through the filter for a measured period of time. FIG. 6 depicts the theoretical alpha particle decay curve of the Radon progeny, RaA+RaC', which are Polonium 218 and 214, respectively, as a function of time after the collection stops and the monitor begins discharging as the alpha particles from the filter paper source enter the monitor's chamber.

The results of the measurements are shown in FIG. 7. The curves in the figure are the voltage discharge curves of the monitor, that is, scale readings versus time for several samples collected in different locations in central New Jersey, including a private home, the inventors' laboratory and outdoors. The monitor was calibrated in units of alpha particle disintegrations per liter of air. A calibration factor of 0.458 dpm l$^{-1}$ of air per divisions/min. was obtained. Noting that the Environmental Protection Agency (EPA) limit is 8.8 dpm l$^{-1}$ of air, the FIG. 7 alpha particle concentrations varied from a minimum level of 0.77 in an outside location to a maximum level of 24.4 dpm l$^{-1}$ in a private home's basement. The latter value is a factor of 2.8 greater than the EPA limit. The other locations have levels slightly above and roughly equal to this limit. Thus, the present invention's monitor covers a practical range of alpha contamination, presently of great interest and importance to the EPA and many others.

The calibration factor of 0.458 dpm l$^{-1}$ per scale division per minute (out of a total of 30 scale divisions in a prototype monitor) applies for a 15-minute sampling period of air flowing at the rate of 20 liters per minute. The sampling time is followed by a one-minute waiting period before the filter paper is placed on the monitor. This time period provides a constant and repetitive delay time for all subsequent measurements.

Accordingly, one object of the present invention is to provide a quick, accurate and inexpensive radiation monitor to measure the background of naturally occurring radioactive daughter decay products of Radon-222 and Radon-220 (Thoron).

Another object of the present invention is to provide a radiation monitor to measure the naturally occurring radioactive isotopes comprising a covering means having a plurality of radiation windows on top of a conductive plastic chamber, a microscope and a carbon fiber electrometer protruding through the chamber's wall.

An additional object of the present invention is to make measurements of the radioactive particles penetrating through the second mylar window of the covering means, which eliminates the contribution to the measurement of the alpha particles and only beta particles and gamma rays are determined. We observed a typical discharge rate of 0.025 times the alpha rate. If the air contains only decay progeny of Radon and Thoron, then the activity decreases by a factor of 1000 within about 70 hours and thus vanishes. This time period is about seven times the half-life of the decay chain 212Pb→>10.6 h,βeta 212Bi→>60.6 min. alpha and beta. In contrast to this environment, when long lifetime radioactive substances such as Thorium, Uranium, Plutonium or others contaminate the air, the activity persists after 70 hours of measurement time. For example in our laboratory, 70 hours after the sample was collected, we measured a persistent 0.0029 times the activity measured immediately after the collection of the sample was terminated. Thus while the short living contamination was approximately 5 dpm l$^{-1}$, the long living contamination was 0.015 dpm l$^{-1}$.

A further object of the present invention is to provide a radiation monitor to measure the concentration of gamma rays emitted by contaminants with the covering means comprising the alpha thin mylar window with a thick plastic window placed over the alpha mylar window, which allows only gamma radiation but absorbs alpha and beta radiation. In this arrangement, the radiation monitor can be used for detecting gamma rays only.

These and other objects are accomplished by the present invention's covering means on top of a pancake-shaped conductive plastic chamber, and a microscope and a carbon fiber electrometer protruding through the chamber's wall. The covering means comprises a plurality of radiation windows, including a thin aluminized electrically conductive polyethylene terephthalate film (mylar) first window to admit alpha particles, which can be combined with a second thicker mylar window to eliminate alpha particles and measure beta and gamma radiation and a plastic window to form the third window. The plastic radiation window of the covering means is a much thicker plastic window to eliminate alpha and beta particles but admit only gamma rays into the chamber. Each of the three windows of the covering means can be advantageously combined or used alone for measuring the different forms of contamination.

In all embodiments, the microscope and electrometer are opposite each other within the chamber and protrude through the chamber wall, with the microscope extending outward through the chamber's wall, being optically focused on the electrometer's carbon fiber. In accordance with the present invention, the alpha and beta thin polyester film windows are aluminized to be electrically conductive and thin enough for the desired radiation particles from the surrounding atmosphere to enter the chamber for measurement. By advantageously including a carbon fiber, self-reading electrometer within the chamber, the user can quickly view the radon dose read-out within the chamber, in real time.

BRIEF DESCRIPTION OF THE DRAWINGS

These and other objects and advantages of the present invention will become readily apparent in light of the Detailed Description of the Invention and the attached drawings wherein.

DESCRIPTION OF THE INVENTION

Figure 1:
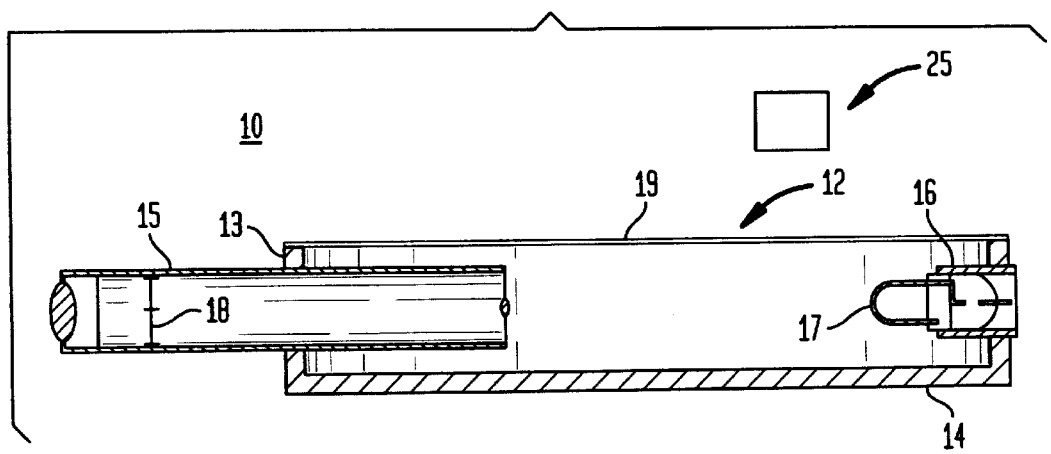
FIG. 1 is a cross sectional view of the preferred embodiment of the alpha, beta, and gamma ray monitor of the present invention.
Figure 3:
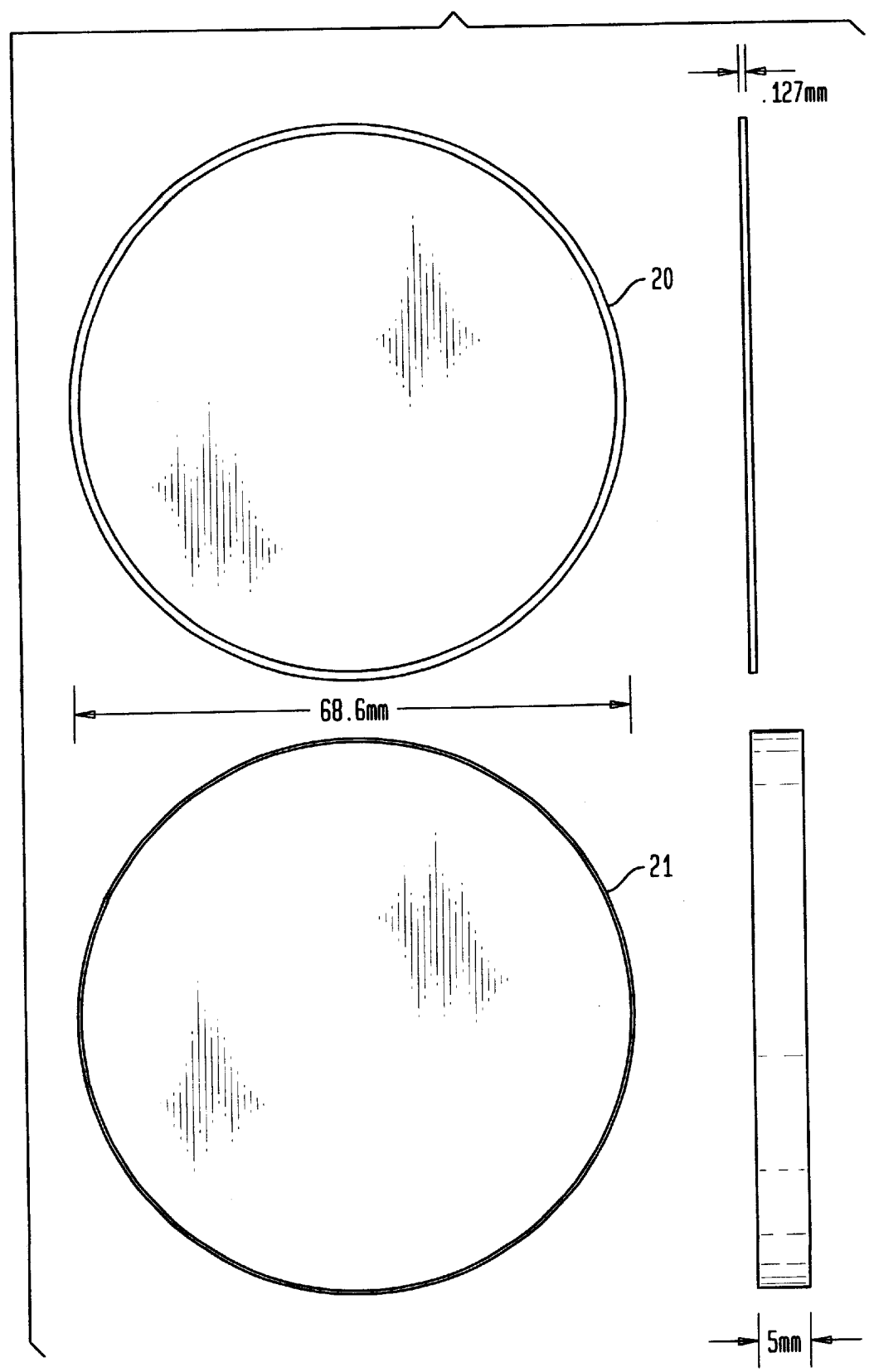
FIG. 3 depicts top and side views of the covering means' beta window for monitoring beta particles and the gamma window for monitoring gamma rays.
Figure 4:
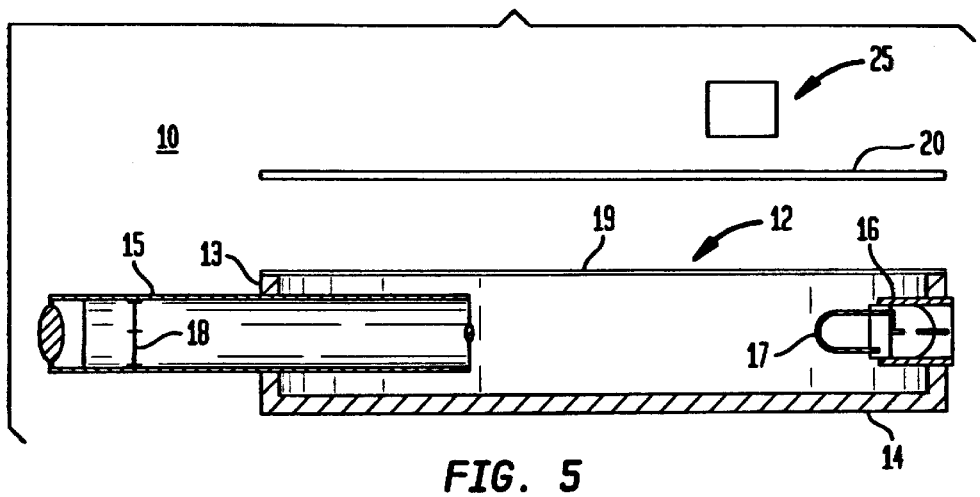
FIG. 4 is a cross sectional view of the alpha, beta, and gamma ray monitor of the present invention configured with a beta cover above the alpha cover prior to stacking these covers.
Figure 5:
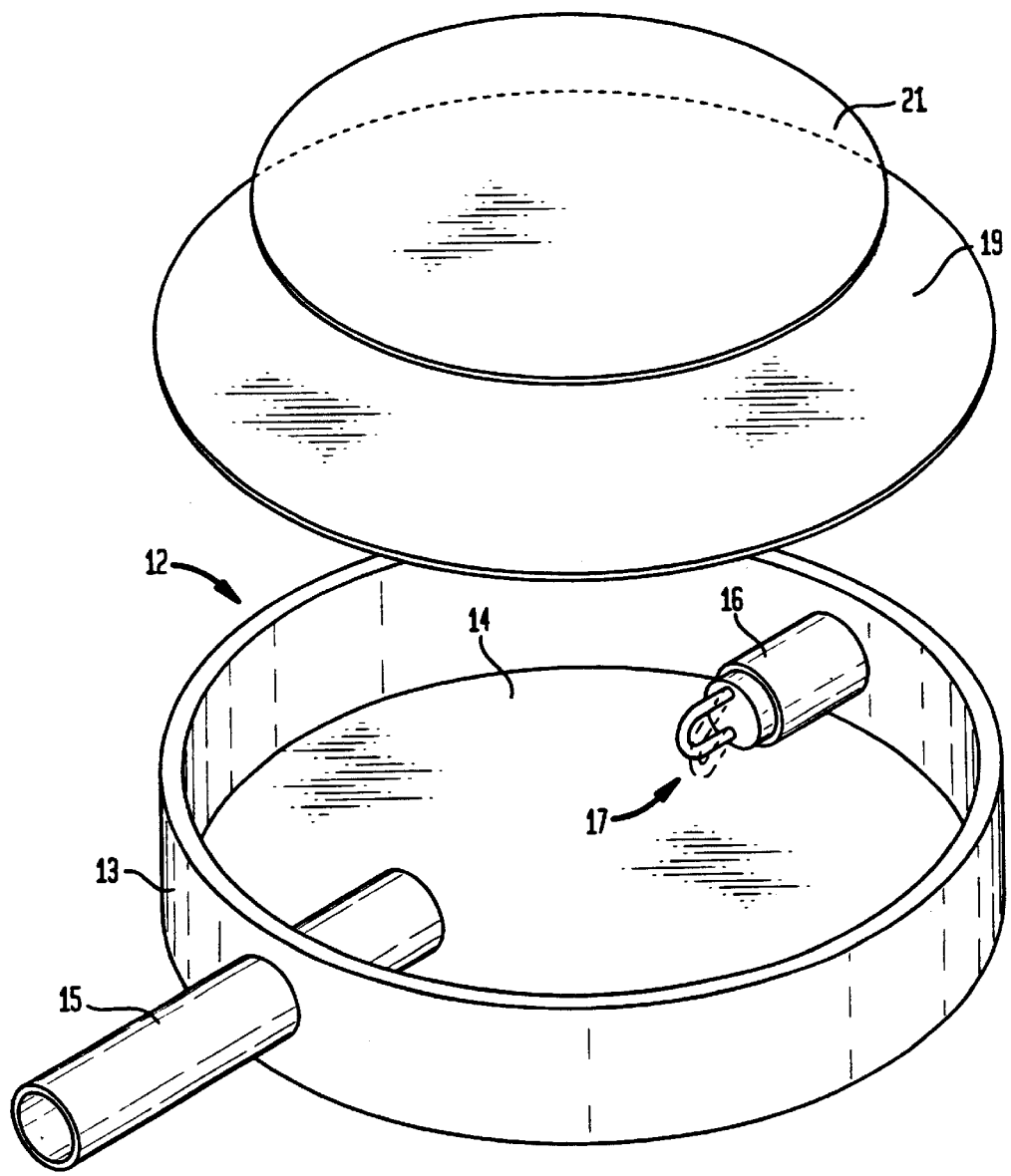
FIG. 5 is a cutaway perspective view of the alpha, beta, and gamma ray monitor of the present invention with the alpha cover and gamma cover removed.

Now referring to the drawings, FIG. 1 is a cross sectional view of the preferred embodiment of the alpha, beta and gamma ray ("ABG") monitor of the present invention. Monitor 10 comprises a covering means fixedly attached atop a chamber 12. The covering means is a plurality of radiation windows. The covering means comprises an alpha window 19 for admitting alpha, beta and gamma rays into said chamber 12, as shown in FIG. 1, a beta window 20 for admitting beta and gamma particles and a gamma ray window 21 for admitting only gamma rays, both of which are depicted in FIGS 3–5. Said alpha window 19 being a thin polyester film window fixedly attached atop said chamber 12. Said chamber 12 having a side wall 13 and a lower surface 14. Said wall 13 having an upper edge and a lower edge.

Figure 2:
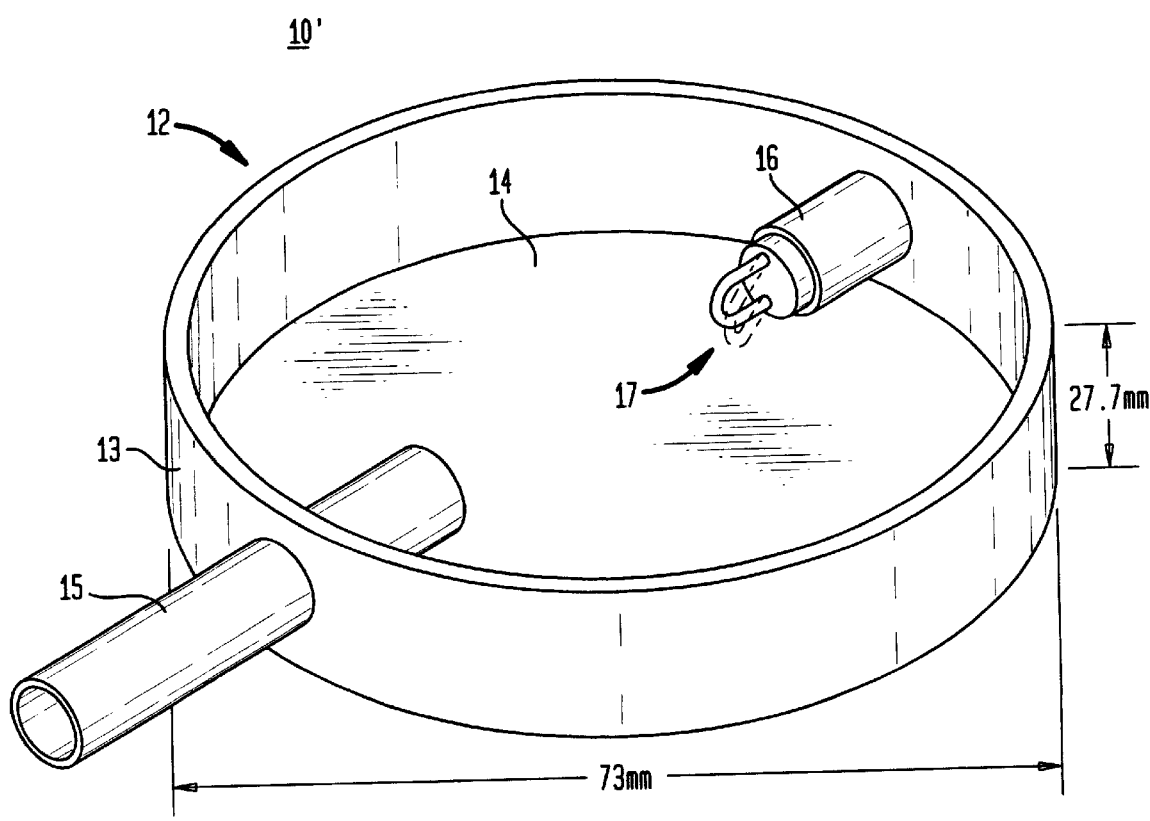
FIG. 2 is a cutaway perspective view of the preferred embodiment of the alpha, beta, and gamma ray monitor of the present invention with the alpha cover removed.

FIG. 2 is a cut-away perspective view of the ABG monitor 10 in which said alpha window 19 has been removed and like numerals are employed for the same structural elements, along with representative dimensions. Both a microscope 15 and carbon fiber electrometer 16 protrude through opposite sections of said wall 13, with said microscope 15 extending outwardly beyond said wall 13 and being optically focused on a carbon fiber 17 of said electrometer 16. FIG. 1 depicts a test object 25 in proximity to said alpha window 19 to measure radiation. In operation, said monitor 10 would most likely be inverted so that alpha cover 19, or any of the other covering means, directly contacts test object 25. Test object 25 could also be a filter paper.

Referring back to FIG. 1, said alpha window 19 is aluminized to be electrically conductive, and therefore is electrically connected to said electrically conductive chamber 12. Said alpha window 19 should not exceed 0.3 mg/cm$^2$ in thickness for alpha particles from test object 25 to enter the air within said chamber 12, and thinner dimensions would also be operative. During transport or storage, said gamma ray window 21 can serve as a protective cover for said chamber 12, or be placed over said alpha window 19 or said beta window 20 when either is attached atop said chamber 12.

Referring back to FIG. 2, said microscope 15 and said carbon fiber electrometer 16 were adapted from the ends of a standard personnel 200 mR plastic dosimeter designed by the Federal Emergency Management Agency, with the original ion chamber removed. Said microscope 15 and said carbon fiber electrometer 16 are precisely located on opposing sections of said wall 13 to focus the microscope's optics on said electrometer 16, and subsequently affixed into said wall 13 opposite from each other within said chamber 12. Said microscope 15 extends outwardly through wall 13 and outside the chamber 12. In accordance with the present invention, said alpha window 19 is sufficiently thin for alpha particles to penetrate said chamber 12.

When ABG monitor 10 is detecting alpha particles, alpha particles inside said chamber 12 generate an ionization charge causing a fiber carbon image of said carbon fiber 17 to move up-scale as a function of time. The enlarged carbon fiber image is viewed against a scale 18 within said microscope 15 increasing from zero to larger scale units, producing a reading, proportional to the number of alpha particles that entered said chamber 12. Further as described below, an alpha particle concentration is then determined by multiplying the scale reading by a calibration factor that converts the scale reading to alpha particle intensity. Thus said ABG monitor 10 is a carbon fiber, self-reading electrometer enabling the user to read-out the alpha particle disintegrations per minute per liter of air in units of dpm $l^{-1}$.

FIG. 2 also provides representative dimensions for the ABG monitor 10. The diameter of chamber 12 is 73 mm and the height of wall 13 is 28 mm. In this view, it is more clearly indicated that said microscope 15 extends through a section of said wall 13 and outwardly beyond said chamber 12. Said chamber 12 is depicted as circular and said alpha window 19 must be fixedly attached to said chamber 12 to operate.

FIG. 3 depicts top and side views of beta window 20 and the gamma window 21, along with representative dimensions. Said beta window 20 and said gamma ray window 21 each have a preferable diameter of 68.6 mm and are constructed to seal chamber 12 and cover the upper edge of said wall 13. Said beta window 20 is constructed of polyester, at least 0.12 mm thick and preferably 0.127 mm thick. Said gamma ray window 21 can be constructed of plastic and is preferably 5.0 mm thick.

Referring now to FIG. 4, which is a cross sectional view of ABG monitor 10, said beta window 20 is shown prior to being stacked onto said alpha window 19. In this configuration, ABG monitor 10 can measure both beta and gamma radiation because the stacking of these windows prevents alpha particles from entering said chamber 12 and permits beta and gamma radiation to enter said chamber 12. Said beta window 20 is constructed of polyester and excludes alpha particles from said chamber 12 but permits both beta particles and gamma rays to enter said chamber 12. By using the somewhat thicker plastic window of gamma ray window 21, the ABG monitor 10 excludes both alpha and beta particles from said chamber 12 and admits only gamma rays into chamber 12.

Referring now to FIG. 5, which is a cutaway perspective view of the ABG monitor 10, said gamma ray window 21 is shown prior to being stacked onto said alpha window 19. In this configuration, ABG monitor 10 can measure only gamma radiation because the stacking of these windows prevents both alpha particles and beta particles from entering chamber 12.

It is within the contemplation of the present invention that these three radiation windows of the covering means, as well as other radiation windows, can be advantageously combined or used alone for measuring the different forms of contamination.

A number of variations and different embodiments are also within the contemplation of the present invention. These variations include different shapes and geometries for the chamber, use of upper and lower windows and varying the effective thickness of the covering means by stacking the beta window 20 and the gamma ray window 21. Said chamber 12 can be built of conductive plastic and may be circular or made in the shape of a pancake.

The circular or pancake shape is significant because of the electric field geometry. The ionization charge generated in the air within said chamber 12 by the radiation field is collected by the electric field and the efficiency of this collection depends uniquely on the field geometry. Other shapes for said chamber 12, such as square or rectangular, would produce poor geometry due to the undesirable reflections and scattering from corners that would cause a much lower charge collection efficiency. Said alpha window 19 is a polyester aluminized film window that can be constructed of mylar, sufficiently thin for alpha particles to freely penetrate said chamber 12. Similarly, said beta window 20 is a somewhat thicker polyester aluminized film window that can be constructed of mylar, sufficiently thin for beta particles to freely penetrate said chamber 12. The gamma ray window 21 is constructed of plastic and its thickness can vary, so long as it is thin enough for gamma rays to penetrate said chamber 12. The dimensions disclosed above indicate that the beta window 20 is thicker than alpha window 19 and that gamma ray window 21 is thicker than beta window 20. When the dimensions of the plurality of radiation windows are varied, the same or similar thickness relationships should also be observed.

Figure 6:
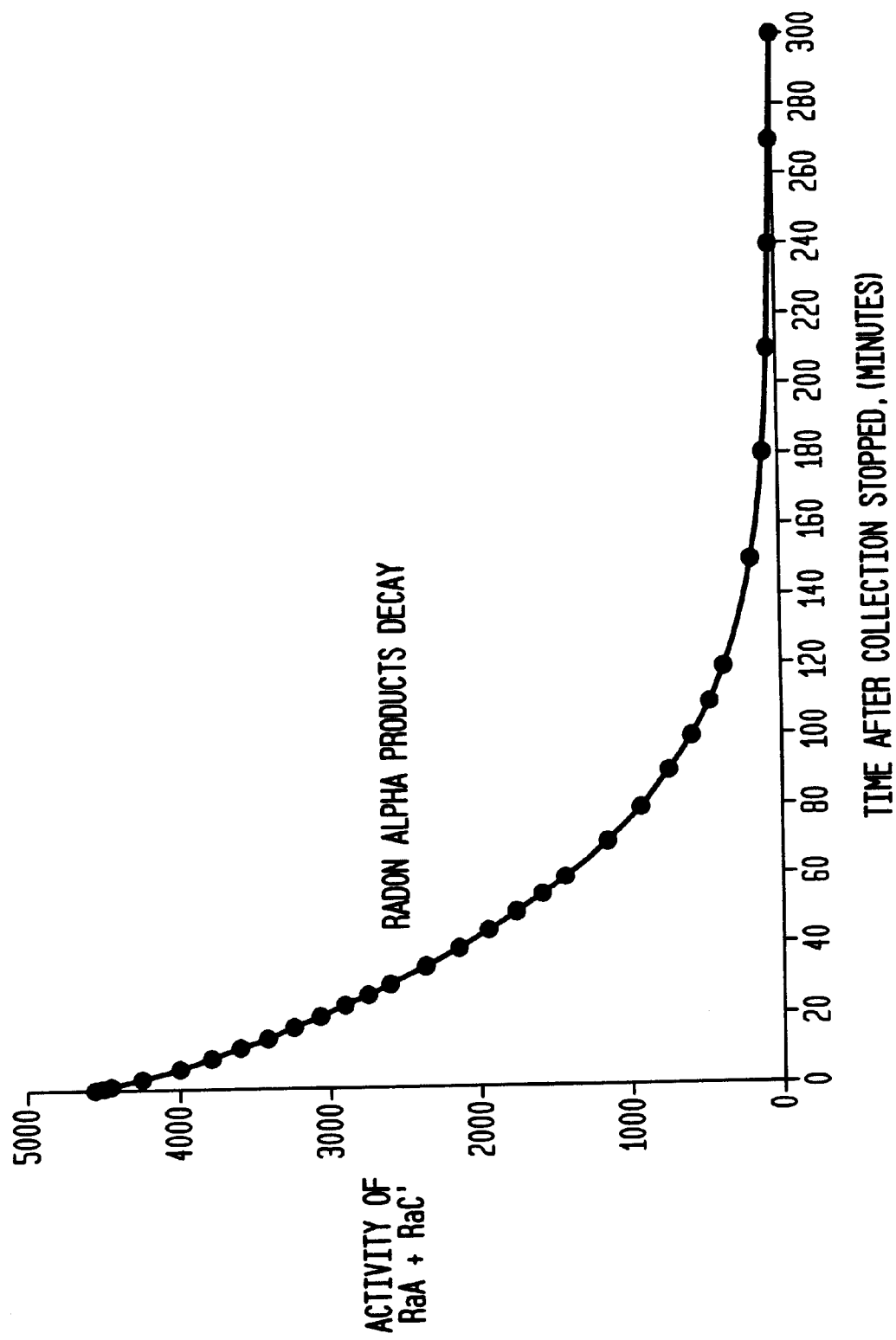
FIG. 6 is a graph depicting the theoretical alpha particle decay curve of the Radon progeny, RaA+RaC', Polonium 218 and 214, respectively, as a function of time.

The FIG. 6 graph depicts the theoretical alpha particle decay curve of the Radon progeny, RaA and RaC', Polonium 218 and 214, respectively, as a function of time after the collection stops and ABG monitor 10 begins discharging. The ABG monitor 10 begins discharging as the alpha particles from the test object 25, such as filter paper source, enter the monitor's chamber 12.

Figure 7:
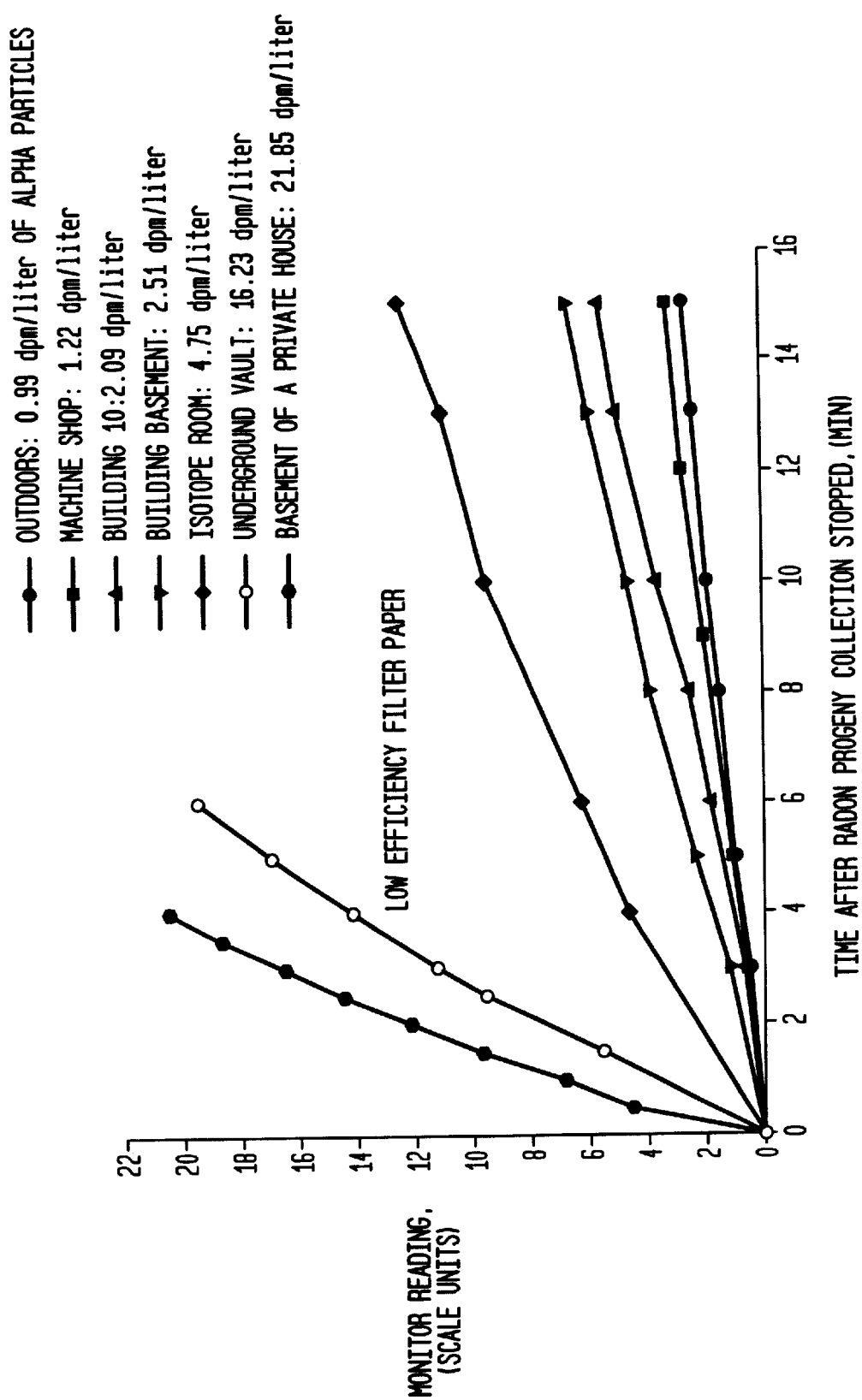
FIG. 7 is a graph depicting measurements of Radon progeny concentrations in ambient air at several central New Jersey locations.

FIG. 7 is a graph depicting measurements of Radon progeny concentrations in ambient air at several central New Jersey locations. This graph shows the increasing scale reading of ABG monitor 10 as a function of time due to alpha particle emitters collected on a test object 25, such as a filter paper. The graph's curves are the voltage discharge curves of ABG monitor 10, i.e. scale readings versus time for several samples collected in five different locations in central New Jersey, including a private home and the inventors' laboratory. The monitor was calibrated in units of alpha particle disintegrations per minute per liter of air. A calibration factor of 0.458 dpm $l^{-1}$ per scale division per minute was obtained. This factor is valid for one specific air sample and the type of filter paper used. An alpha particle energy calibration factor of 1528 MeV per scale division can be used when the device is employed for measuring the total alpha energy emission. Other samples and filter papers would be expected to yield somewhat different calibration factors. A beta particle calibration factor of $7\times10^4 \beta/\text{dive}^{-1}$, Sr-90 and a gamma radiation calibration factor is 3 mR full scale (30 scale units) were obtained.

The alpha particle concentrations for each location are shown in FIG. 7. The Environmental Protection Agency (EPA) limit is 8.8 dpm $l^{-1}$ of air. Based on the curves in FIG. 7, the alpha particle intensity varied from a minimum level of 0.77 in an outside location to a maximum level of 24.4 dpm $l^{-1}$ in a private home, which is a factor of 2.8 greater than the 8.8 dpm $l^{-1}$ EPA limit. The other locations have levels below this limit. Thus, the present invention's monitor covers a practical range of alpha contamination.

It is also within the contemplation of the present invention to provide a pair of alpha windows 19. In this configuration, the solid conductive lower surface 14 of chamber 12 is removed and a thin polyester aluminized window is attached to the lower edge of wall 13, along with alpha window 19 fixedly attached atop the upper edge of wall 13. This double window arrangement would be used for situations when enhanced sensitivity is required because concentrations of contaminants are very low.

It is to be understood that such other features and modifications to the foregoing detailed description are within the contemplation of the invention, which is not limited by this description. As will be further appreciated by those skilled in the art, any number of configurations of alpha particle monitors and dosimeters, as well any number of combinations of monitors and differing materials and thicknesses can achieve the results described herein. Accordingly, the present invention should not be limited by the foregoing description, but only by the appended claims.

What we claim is:

1. An alpha, beta and gamma radiation monitor for radioactive contamination, comprising a chamber having a wall and a lower surface;

a microscope extending through said wall opposes an electrometer, said electrometer protruding through said wall and having a carbon fiber within said chamber to generate a carbon fiber image;

a covering means mounted on an upper edge of said wall;

said covering means further comprising a plurality of radiation windows, each of said plurality of radiation windows being removable and being sufficiently thin for discrete types of radiation to penetrate said chamber;

said monitor being placed in proximity to a radioactive contamination sample;

an alpha window of said plurality of radiation windows permitting alpha particles from said radioactive contamination sample to penetrate said chamber;

said alpha particles emitting an alpha energy; and said alpha particles generating an ionization charge causing said carbon fiber image to move upscale as a function of time to produce an alpha particle reading.

2. The alpha, beta and gamma radiation monitor, as recited in claim 1, further comprising said carbon fiber image being seen through said microscope against a scale disposed within said microscope to produce an alpha scale reading.

3. The alpha, beta and gamma radiation monitor, as recited in claim 2, further comprising said wall and said lower surface being constructed of conductive plastic.

4. The alpha, beta and gamma radiation monitor, as recited in claim 3, further comprising said chamber being built in a circular shape.

5. The alpha, beta and gamma radiation survey device, as recited in claim 4, wherein said alpha window is dimensioned to cover said chamber.

6. The alpha, beta and gamma radiation monitor, as recited in claim 5, further comprising:

said alpha window is aluminized to be electrically conductive; and said alpha window is a polyester electrically conductive film window.

7. The alpha, beta and gamma radiation monitor, as recited in claim 6, wherein said alpha window is constructed of mylar.

8. The alpha, beta and gamma radiation monitor, as recited in claim 7, wherein said alpha window is at least 0.3 mg./$cm^2$ thick.

9. The alpha, beta and gamma radiation monitor, as recited in claim 8, further comprising calculating an alpha particle concentration by multiplying said alpha scale reading by an alpha particle calibration factor.

10. The alpha, beta and gamma radiation monitor, as recited in claim 9, further comprising said alpha particle calibration factor being 0.458 dpm $l^{-1}$ per scale division per minute.

11. The alpha, beta and gamma radiation monitor, as recited in claim 10, further comprising an alpha particle calibration energy factor of 1528 MeV per scale division for measuring said alpha energy.

12. The alpha, beta and gamma radiation monitor, as recited in claim 11, further comprising:

removing said lower surface of said chamber; and mounting an upper alpha window on an upper portion of said wall and a lower alpha window mounted on a lower portion of said wall.

13. The alpha, beta and gamma radiation monitor, as recited in claim 5, further comprising:

a beta window of said plurality of radiation windows is stacked on top of said alpha window;

said beta window prevents alpha particles from said radioactive contamination sample penetrating said chamber and is sufficiently thin to permit beta particles and gamma radiation from said radioactive contamination sample to penetrate said chamber; and said beta particles and gamma radiation generating a second ionization charge causing said carbon fiber image to move upscale as a function of time to produce a beta scale reading and a gamma radiation scale reading.

14. The alpha, beta and gamma radiation monitor, as recited in claim 13, further comprising:

said beta window being dimensioned to fit over said alpha window; and said beta window is thicker than said alpha window.

15. The alpha, beta and gamma radiation monitor, as recited in claim 14, wherein said beta window is constructed of mylar at least 0.12 mm thick.

16. The alpha, beta and gamma radiation monitor, as recited in claim 15, further comprising calculating a beta particle concentration by multiplying said beta scale reading by a beta particle calibration factor.

17. The alpha, beta and gamma radiation monitor, as recited in claim 16, further comprising calculating a gamma radiation concentration by multiplying said gamma radiation scale reading by a gamma radiation calibration factor.

18. The alpha, beta and gamma radiation monitor, as recited in claim 17, wherein said beta particle calibration factor is $7 \times 10^4 \beta/\text{div}^{-1}$, Sr-90.

19. The alpha, beta and gamma radiation monitor, as recited in claim 18, wherein said gamma radiation calibration factor is 3 mR full scale (30 scale units).

20. The alpha, beta and gamma radiation monitor, as recited in claim 12, further comprising:

covering said upper alpha window with an upper beta window;

and covering said lower alpha window with a lower beta window.

21. The alpha, beta and gamma radiation monitor, as recited in claim 4, further comprising:

said alpha window is removed from said top portion of the chamber;

a gamma ray window of said plurality of radiation windows is mounted on said top portion of the chamber;

said gamma ray window prevents said alpha particles and said beta particles from said radioactive contamination sample penetrating said chamber and is sufficiently thin to permit gamma radiation from said radioactive contamination sample to penetrate said chamber; and said gamma radiation generating a third ionization charge causing said carbon fiber image to move upscale as a function of time to produce a gamma radiation reading.

22. The alpha, beta and gamma radiation survey device, as recited in claim 21, wherein said gamma ray window is dimensioned to cover said chamber.

23. The alpha, beta and gamma radiation monitor, as recited in claim 22, wherein:

said gamma ray window is aluminized to be electrically conductive;

said gamma ray window is thicker than said beta window; and said gamma ray window is constructed of plastic.

24. The alpha, beta and gamma radiation monitor, as recited in claim 22, wherein said gamma ray window is constructed of aluminum.

25. The alpha, beta and gamma radiation monitor, as recited in claim 24, wherein said gamma window is at least 5.0 mm. thick.

26. The alpha, beta and gamma radiation monitor, as recited in claim 25, further comprising calculating a gamma radiation concentration by multiplying said gamma radiation scale reading by said gamma radiation calibration factor.

27. The alpha, beta and gamma radiation monitor, as recited in claim 26, further comprising said gamma ray window being a protective cover for transport or storage of said chamber.

28. The alpha, beta and gamma radiation monitor, as recited in claim 12, further comprising:

removing said upper alpha window;

removing said lower alpha window;

mounting an upper gamma ray window on said upper portion of the wall; and mounting a lower gamma ray window on said lower portion of the wall.

29. The alpha, beta and gamma radiation monitor, as recited in claim 1, wherein:

said chamber is 73 mm in diameter; and said wall is 28 mm high.

30. The alpha, beta and gamma radiation monitor, as recited in claim 1, wherein:

said chamber is 73 mm in diameter; and said wall is 55 mm high.

* * * * *